United States Patent
Petersen et al.

[15] 3,701,939
[45] Oct. 31, 1972

[54] REVERSE VOLTAGE CIRCUIT FOR THYRISTORS

[72] Inventors: Tom Kastrup Petersen; Neils Juul Henriksen, both of Nordborg, Denmark

[73] Assignee: Danfoss A/S, Nordborg, Denmark

[22] Filed: Dec. 28, 1970

[21] Appl. No.: 101,599

[30] Foreign Application Priority Data
Dec. 29, 1969 Denmark..................6861

[52] U.S. Cl............321/45 R, 307/252 M, 321/45 C, 323/22 SC, 323/38
[51] Int. Cl..................................H02m 7/52
[58] Field of Search..........321/2, 45 R, 45 C, 45 ER; 323/22 SC, 23, 24, 25, 38; 307/252 M, 252 T

[56] References Cited

UNITED STATES PATENTS

| | | | |
|---|---|---|---|
| 3,629,673 | 12/1971 | Thorborg | 321/45 C |
| 3,641,364 | 2/1972 | Rippel | 307/252 M |
| 3,308,371 | 3/1967 | Studtmann, Jr. | 321/45 ER |
| 3,349,315 | 10/1967 | Studtmann | 321/45 C |
| 3,405,346 | 10/1968 | Krauthamer | 321/45 C |

FOREIGN PATENTS OR APPLICATIONS 1,174,086  12/1969  Great Britain..........321/45 C

*Primary Examiner*—Gerald Goldberg
*Attorney*—Wayne B. Easton

[57] ABSTRACT

The invention relates to a reverse voltage circuit for thyristors which has particular application to an inverter circuit. The basic circuit includes a thyristor, a first diode, and a transformer having the primary winding thereof in series relation to the diode. The first diode and the transformer primary winding are in parallel relation to the thyristor with the diode being antiparallel relative to the thyristor. The transformer secondary winding and a second diode are in series and a D.C. voltage source biases the second diode in a counter direction relative to the secondary winding. With this circuit higher reverse voltages are obtained having relatively lengthy durations to effect switching off of a thyristor in a satisfactory manner.

3 Claims, 3 Drawing Figures

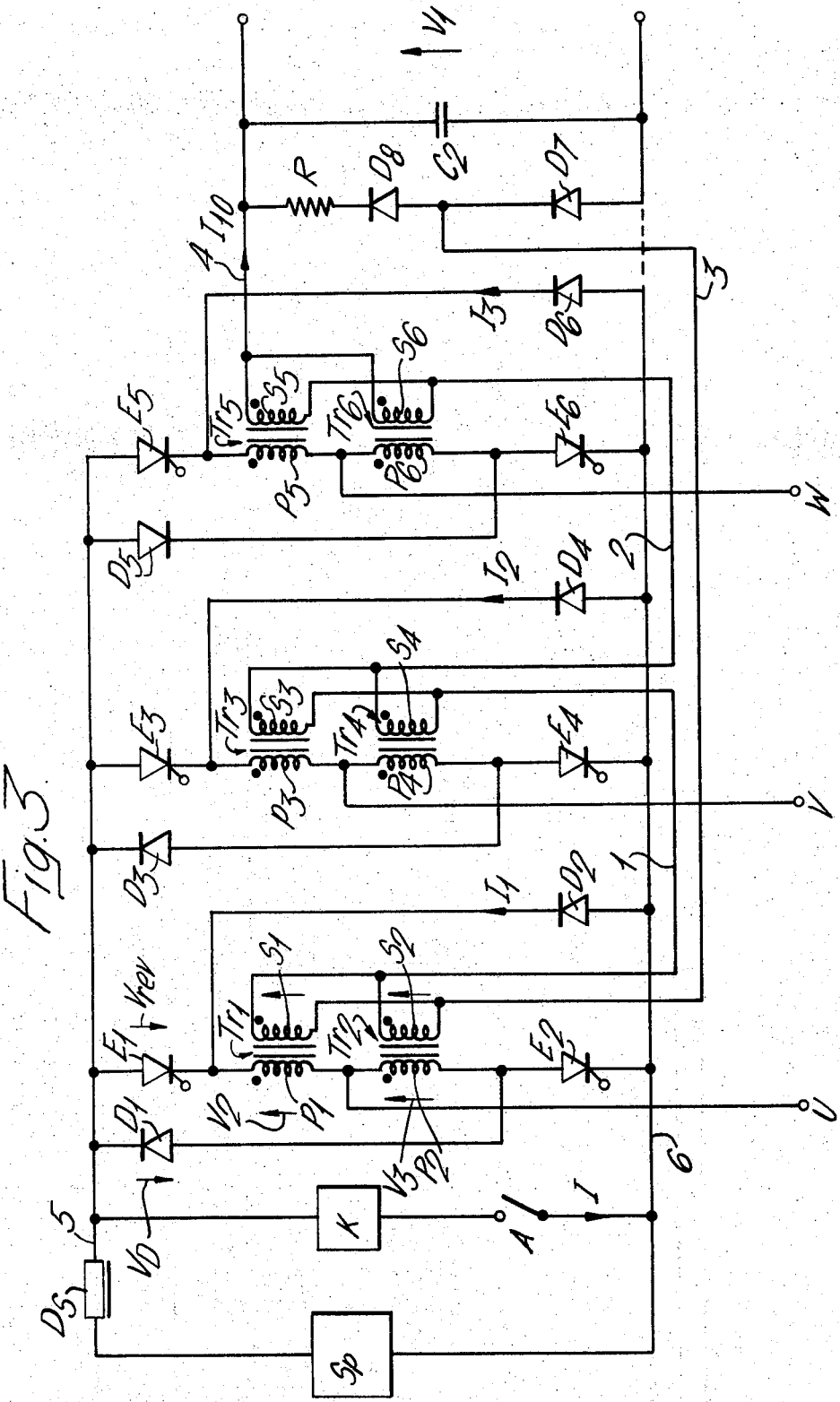

REVERSE VOLTAGE CIRCUIT FOR THYRISTORS

The invention concerns a reverse voltage circuit for thyristors and of the kind in which a diode is connected in parallel with the thyristor but with current flowing through in the opposite direction. Such thyristor circuits are normally connected to a commutation circuit controlling the thyristor, and have the disadvantage that they require a thyristor of high quality and operating on very low reverse voltages, i.e. the voltage at which the thyristor is effectively switched off.

A further problem was that of obtaining voltage impulses of sufficiently lengthy duration so that switching off could be achieved effectively. With these heavy currents in particular, the stray inductance can cause reduction in voltage in conductors, including those running to the reverse voltage diode, so that the thyristor is not switched off in a satisfactory manner and the period during which voltage occurs is too brief.

It is also possible in other circuits to obtain much higher voltages which are in fact higher than is necessary for switching off the thyristor, so that the cost of the circuit is consequently increased.

The object of the invention is to provide a circuit in which a higher voltage can be obtained and in which the magnitude of the voltage itself can be determined to some extent, so that even thyristors having relatively poor characteristics, particularly the magnitude of the reverse voltage, do not constitute a very critical factor.

According to the invention, this object is achieved by connecting in series with the diode the primary winding of a transformer having at least a primary and a secondary winding, and the secondary winding of which is connected through a second diode to a D.C. voltage source which biases the second diode, and in that the voltage induced in the secondary winding of the transformer runs counter to the bias of the second diode. Thus, the switch-off current which flows through the diode connected in parallel with the thyristor is caused to induce a voltage in the transformer which voltage, because of the self-induction of the transformer, instantaneously rises to a high level and cancels out the bias in the second diode, and the primary voltage thus occurring in the transformer can be set to a quite high level, so that the magnitude of the voltage is adjusted to suit the thyristor.

It is also expedient if the D.C. voltage source is constituted by a constant voltage supply. In this way, it becomes possible to keep the voltage substantially constant over a longer span of time, and in fact until current flows in the diode connected in parallel with the thyristor. This constant voltage can be obtained in a particularly simple manner if the voltage source has a condenserfilter output section.

Further simplification of such equipment is achieved by the D.C. voltage source being constituted by a common supply voltage, and by a condenser being connected in parallel over the output section of the D.C. voltage source. This renders it possible for the common voltage supply to be used for the entire circuit in order to provide the voltage, and at the same time the energy or the greater part of the energy, used in the course of commutation, is recouped.

In the case of thyristor inverters, which comprise thyristor phase-branches consisting of thyristors connected in series and having no-load diodes connected in parallel with the thyristors, use can be made of this circuit since it is characterized in that the primary windings of the transformer are directly connected in series and their common junction constitutes a phase-voltage tap-off point, in that the no-load diode-cathode of the first thyristor is connected to the anode of the first thyristor, and the anode of the no-load diode is connected to the common point of the second primary winding and of the anode of the second thyristor, and in that the anode of the second no-load diode is connected to the cathode of the second thyristor, and the cathode of the second no-load diode is connected to the common point of the first primary winding and of the cathode of the first thyristor. In this arrangement, the primary windings of the transformers can replace the known center-point choke, while all the advantages of the circuit are retained. Circuits of this kind are known. U.S. In inverters of this kind it is advantageous, in the case of those types in which the thyristor phase-branches are jointly reversed, to connect in series the secondary windings of the transformer in the phase-branches, and for the second diode and the D.C. voltage source to be common to all the thyristor branches. In this way, a saving is achieved in that, for example in the case of three-phase inverters, only one instead of three diodes is required, while at the same time, the energy is channelled back to the voltage supply for the equipment. In such equipment it is also advantageous to connect the secondary windings in parallel in each branch, since this leads to a better transmission ratio in the transformers as well as to reduction of the total voltage required for the D.C. voltage source that biases the diode.

The invention will now be described in more detail by reference to the drawing, in which:

FIG. 3 is a diagram relating to the inverter in accordance with the invention.

Figure 1:
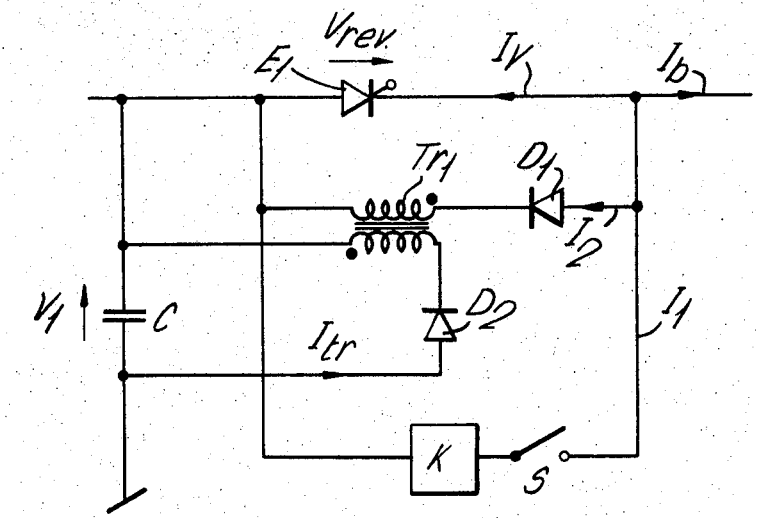
FIG. 1 illustrates the principle of the circuit.
Figure 2:
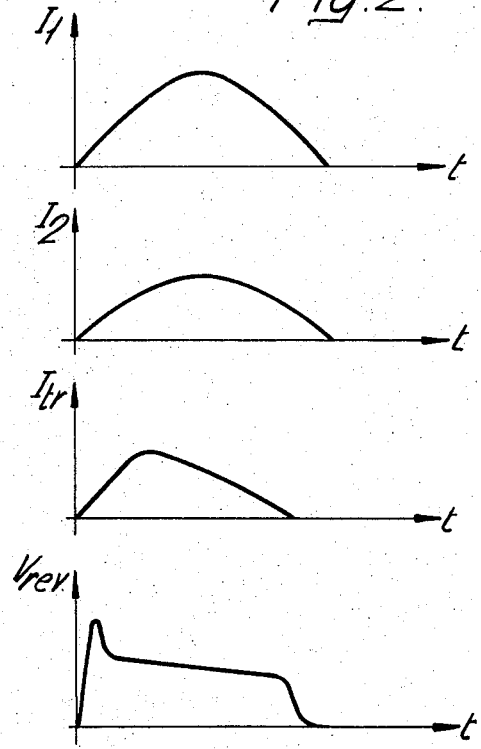
FIG. 2 shows the current curve.

The thyristor $E_1$ is inserted between a voltage supply $V_1$ and a consumer unit, not illustrated, an operating current $I_b$ flowing towards this unit. The diode $D_1$ is connected in parallel with the thyristor but in the opposite direction, and a primary winding of a transformer $Tr_1$ is connected in series with this diode. The secondary of the transformer is connected in parallel, through a second diode $D_2$, with a condenser C, which capacitor is charged to a level corresponding to the value of the supply voltage $V_1$.

When the thyristor is to be switched off, a current $I_1$ can be passed from a commutation circuit K through a switch S. This current is divided into the operating current $I_b$ and the reverse current $I_v$ which passes through the thyristor $E_1$. This current also supplies a current $I_2$ which passes through the diode $D_1$ and the primary winding of the transformer $Tr_1$. The current $I_2$ will now provide a quite large voltage by way of the primary of the transformer because of the self-induction of the latter. This voltage now induces, in the winding directions indicated by dots, a voltage in the secondary of the transformer opposed to the voltage $V_1$, which biases the diode $D_2$. The voltage now rises almost instantaneously to a value which is greater than $V_1$, and a voltage, which is substantially constant and dependent upon the transmission ratio of the transformer, is generated on the primary side of the transformer as long as the current $I_{tr}$ is flowing. In the case here illustrated in which the supply voltage is used, a suitable transmission ratio is one in the order of magnitude of 1 − 5 or more. The reverse voltage over the thyristor $E_1$ is now the sum of the voltage-drop at the diode, amounting to 1 − 1.5 Volts, and of the voltage over the transformer, amounting to 30 − 40 Volts, depending upon the transmission ratio. In contrast to other circuits, a certain controllable voltage is here obtained as a counter-voltage over the thyristor, which counter-voltage helps to close the thyristor in an effective manner, even in the case of thyristors where the reverse voltage is very critical, since the values of their parameters can fluctuate somewhat. A similar circuit is used in the inverter shown in FIG. 3 where a voltage supply $S_p$ provides the inverter with voltage through the choke $D_s$ and by way of the conductors 5 and 6. A commutation unit K is arranged in parallel over these conductors and in series with an interruptor A which is used for jointly reversing all the phase-branches. The three phase-branches here shown are identical, each containing two controlled thyristors $E_1$, $E_2$, $E_3$ and $E_4$, $E_5$ and $E_6$, connected in series. Between the two series-connected thyristors is inserted the primary winding of two transformers, and the common middle points between the transformers $Tr_1$ and $Tr_2$, $Tr_3$ and $Tr_4$, $Tr_5$ and $Tr_6$ constitute the phase-voltage tappings U, V, and W. In branch 1 the primary windings $P_1$ and $P_2$ are thus connected in series with the winding directions indicated by the dots. The same applies in the case of the other branches of the windings $P_3$, $P_4$, $P_5$ and $P_6$.

In parallel over the series connections $E_1 - P_1 - P_2$, $E_3 - P_3 - P_4$, $E_5 - P_5 - P_6$, the diodes $D_1$, $D_3$ and $D_5$ are connected in the opposite direction in relation to the thyristors $E_2$, $E_3$ and $E_5$. The diodes $D_2$, $D_4$ and $D_6$ are connected in parallel over the series connections $P_1 - P_2 - E_2$, $P_3 - P_4 - E_4$ and $P_5 - P_6 - E_6$. The diodes $D_1 - D_6$ are no-load diodes for the inverter. The secondaries in the individual phase-branches are connected in parallel with the winding direction indicated by the dots, e.g. in the phase-branches U at $S_2$. The parallel-connected secondary winding $S_1$ and $S_2$, $S_3$ and $S_4$, $S_5$ and $S_6$ are connected in series with each other in pairs through the conductors 1, 2, 3 and 4. The conductors 3 and 4 are again connected through the diode $D_7$ to the condenser $C_2$ which is charged to the voltage $V_1$ with the polarity indicated by the arrow. The diode $D_8$ and the resistor R constitute a damping member. The inverter is jointly reversed through the commutation circuit K and the interruptor A, and if the interruptor A is closed, a current I flows through the conductor 6. This current divides into part-currents $I_1$, $I_2$ and $I_3$ in the various phase-branches. In the phase-branch U for example the current $I_1$ flows through the diode $D_2$, the primary windings $P_1$ and $P_2$ and the diode $D_1$ and back to the commutation circuit. As this happens, a voltage $V_2$ and $V_3$ having the polarity indicated is induced in the primary windings, and this voltage rises rapidly because of the self-induction of the transformer when not loaded, and an induced voltage having a polarity indicated by the arrow occurs in the secondary of the transformer. The sum of these voltages is opposed to the voltage $V_1$ in the winding directions indicated, and when this voltage exceeds the voltage $V_1$, a current flows through the diode $D_7$, and as long as the current $I_1$ is flowing a substantially constant voltage occurs in the phase-branch U by way of the primary windings $P_1 - P_2$. This voltage can drop somewhat because of the possible stray self-induction of the transformer. The voltages occurring in each phase-branch during switching off bias the thyristors $E_1$, $E_2$, $E_3$, $E_4$, $E_5$ and $E_6$, so that the thyristors are effectively switched off. The resultant voltage impulse is of considerable duration and in fact is equal to approximately 80 percent of the switch-off period. This impulse is thus more suitable, the characteristics of the thyristors used being quite uncritical as regards their reverse voltage. At the same time the self-induction of the supply leads and the effect of other self-induction is considerably suppressed, since the voltages $V_2$ and $V_3$ are now determined by the transmission ratio of the transformer and by the voltage $V_1$, and can therefore be of a magnitude necessary for providing reasonable safety. In the case of earlier connections it was necessary to grade these thyristors, whereas they are now quite uncritical because of the high voltage of between 30 − 40 volts now available, while at the same time, the voltage or voltage impulse is of greater duration. The voltage across the condenser $C_2$ can either be obtained from a separate voltage source, preferably a constant voltage source, or from the voltage supply for the inverter. In this way, the commutation energy now used is returned directly to the current supply, so that it is not lost, and this greatly improves the economics of the equipment. This is achieved by making the broken-line connection from the anode of diode 7 to the anode of diode 6 and by connecting the conductor 4 to the positive terminal of the voltage supply. The principle upon which the inverter here illustrated is based is described in our U.S. Pat. No. 3,559,034 granted Jan. 26, 1971 and titled "Inverted Converter Having Common Quenching Means For All Controllable Rectifiers."

What is claimed is:

1. A reverse voltage circuit for a thyristor comprising: a thyristor; a transformer having a primary winding and a secondary winding; a first conductor path connected in parallel with said thyristor, said first path including said primary winding in series with a first diode poled in the reverse direction relative to said thyristor; a second conductor path connected in parallel with said thyristor, said second path including commutator means and switch means which is closed under the control of said commutator means when a reverse voltage is to be applied across said thyristor, closure of said switch means causing a current to flow in said first path in the forward conducting direction of said first diode; a second diode and a capacitor connected in series with said secondary winding; and charging means for charging said capacitor in a sense to apply a reverse voltage across said second diode; closure of said switch means causing a current to flow in said primary winding to induce a voltage in said secondary winding sufficient to overcome the reverse voltage across said second diode whereby current flows in said secondary winding and a reverse voltage substantially in excess of the forward voltage drop of the first diode is applied across said thyristor.

2. A reverse voltage circuit according to claim 1 wherein said charging means is a constant voltage D.C. supply.

3. An inverter comprising at least one thyristor phase branch with first and second thyristors in series; first and second transformers each having primary and secondary windings, said primary windings being in series with each other and with said thyristors, said primary windings being between said thyristors, and the common junction of said primary windings forming a phase voltage tapping; a first diode in parallel with said primary windings and said first thyristor; a second diode in parallel with said primary windings and said second thyristor, said diodes being in anti-parallel relation respectively to said thyristors; a path connected in parallel with said branch, said path including commutator means and switch means which is closed under the control of said commutator means when a reverse voltage is to be applied across said thyristors; a third diode and a capacitor connected in series with said secondary windings; and charging means for charging said capacitor in a sense to apply a reverse voltage across said third diode; closure of said switch means causing a current to flow in said primary windings to induce a voltage in said secondary windings sufficient to overcome the reverse voltage across the third diode whereby current flows in said secondary windings and a reverse voltage substantially in excess of the forward voltage drops of the first and second diodes is applied across said thyristors.

* * * * *